(12) United States Patent
Alexander et al.

(10) Patent No.: US 9,416,482 B2
(45) Date of Patent: Aug. 16, 2016

(54) HOUSEHOLD APPLIANCES AND METHODS OF CONTROL

(75) Inventors: Benjamin E. Alexander, Stevensville, MI (US); Brian A. Black, Saint Joseph, MI (US); Thomas A. Latack, Baroda, MI (US); Matthew D. Rhodes, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 903 days.

(21) Appl. No.: 13/596,457

(22) Filed: Aug. 28, 2012

(65) Prior Publication Data

US 2014/0060581 A1    Mar. 6, 2014

(51) Int. Cl.
*D06F 39/02* (2006.01)
*A47L 15/44* (2006.01)

(52) U.S. Cl.
CPC ............. *D06F 39/02* (2013.01); *A47L 15/449* (2013.01); *A47L 15/4463* (2013.01); *A47L 15/4472* (2013.01)

(58) Field of Classification Search
CPC ....... D06F 39/02; D06F 39/022; A47L 15/44; A47L 15/4463; A47L 15/4472; A47L 15/449; A47L 15/0055; A47L 15/4454; A47L 2401/02; A47L 2401/021; A47L 2401/023; A47L 2501/265; B67D 7/02; B65D 85/8043; B65D 85/8046; B65D 85/808; B65D 2081/007; B65B 29/02; A47J 31/3623; A47J 31/3633; A47J 31/3638; A47J 31/3642

USPC ............... 134/18, 56 D, 56 R; 68/17 R, 17 A; 426/77–84, 115; 99/295, 323
See application file for complete search history.

(56) References Cited

U.S. PATENT DOCUMENTS

| | | | |
|---|---|---|---|
| 4,845,965 A | | 7/1989 | Copeland et al. |
| 5,417,233 A | * | 5/1995 | Thomas et al. ................. 134/93 |
| 5,644,936 A | | 7/1997 | Yasutake et al. |
| 6,941,678 B2 | | 9/2005 | Park |
| 7,036,177 B2 | | 5/2006 | Aouad et al. |
| 7,445,013 B2 | | 11/2008 | Vanderroest et al. |
| 7,523,758 B2 | | 4/2009 | Vanderroest et al. |
| 7,814,597 B2 | | 10/2010 | Fife et al. |
| 8,010,211 B2 | | 8/2011 | Hendrickson et al. |
| 2002/0088502 A1 | | 7/2002 | Van Rompuy et al. |
| 2004/0088796 A1 | * | 5/2004 | Neergaard .......... A47L 15/4454 8/158 |
| 2005/0081572 A1 | | 4/2005 | Park et al. |
| 2007/0000291 A1 | * | 1/2007 | France et al. ................. 68/12.18 |
| 2010/0000022 A1 | | 1/2010 | Hendrickson et al. |
| 2010/0000024 A1 | | 1/2010 | Hendrickson et al. |

(Continued)

FOREIGN PATENT DOCUMENTS

| | | |
|---|---|---|
| DE | 10039408 A1 | 12/2001 |
| EP | 2402497 A1 | 1/2012 |

(Continued)

*Primary Examiner* — Michael Kornakov
*Assistant Examiner* — Katelyn Whatley

(57) ABSTRACT

A household appliance having a treating chamber in which is received an article for treatment, a treating chemistry dispenser configured to receive a unit dose container for the treating chemistry, and a controller for executing at least one cycle of operation and a method of operating the household appliance to physically alter a unit dose container in conjunction with a at least one cycle of operation and sensing same.

23 Claims, 11 Drawing Sheets

(56) References Cited

U.S. PATENT DOCUMENTS

| | | |
|---|---|---|
| 2010/0000112 A1 | 1/2010 | Carow et al. |
| 2010/0000264 A1 | 1/2010 | Luckman et al. |
| 2010/0000573 A1 | 1/2010 | Hendrickson et al. |
| 2010/0000581 A1 | 1/2010 | Doyle et al. |
| 2010/0000586 A1 | 1/2010 | Hendrickson |
| 2010/0095465 A1 | 4/2010 | Kim et al. |
| 2010/0146587 A1* | 6/2010 | Sholes ............ B67D 7/02 726/2 |
| 2010/0212700 A1 | 8/2010 | Wattley et al. |
| 2010/0300157 A1 | 12/2010 | Schulze |
| 2010/0321161 A1 | 12/2010 | Isabell |
| 2011/0037569 A1* | 2/2011 | Kiy ............ A61J 1/035 340/10.1 |
| 2011/0077772 A1* | 3/2011 | Buck ............ A47L 15/0055 700/240 |
| 2011/0082595 A1 | 4/2011 | Mehus et al. |
| 2011/0174345 A1 | 7/2011 | Carrer et al. |
| 2011/0247663 A1* | 10/2011 | Gadini et al. ............ 134/115 R |
| 2013/0000781 A1* | 1/2013 | Bischoff et al. ............ 141/330 |

FOREIGN PATENT DOCUMENTS

| | | |
|---|---|---|
| GB | 2134078 A | 8/1984 |
| JP | 4187183 A | 7/1992 |

\* cited by examiner

HOUSEHOLD APPLIANCES AND METHODS OF CONTROL

CROSS-REFERENCE TO RELATED APPLICATIONS

This application is related to patent application Ser. No. 13/569,357, entitled Household Appliance Having a Physical Alteration Element, and patent application Ser. No. 13/596,401, entitled Household Appliance Having a Physical Alteration Element, both filed Aug. 28, 2012.

BACKGROUND

Household appliances, such as clothes washers, dispensing dryers, and dishwashers, may include a treating chamber in which items are placed for treating and a dispensing system for dispensing treating chemistries to achieve better cleaning. Single dose cartridges may be used within the dispensing system to provide treating chemistry to the treating chamber for use in the household appliance. A reduced cleaning effect or damage to the appliance or items to be treated may be caused if the unit dose present in the dispensing system is not a new, full unit dose package.

BRIEF DESCRIPTION OF THE INVENTION

According to an embodiment of the invention, a method of operating a household appliance having a treating chamber, a treating chemistry dispenser configured to receive a unit dose container for the treating chemistry, and a controller for executing at least one cycle of operation includes physically altering the unit dose container in conjunction with a first execution of an at least one cycle of operation, sensing the physical alteration in conjunction with a second execution of an at least one cycle of operation, determining a presence of a physically altered unit dose container, and providing an indication of the presence of the physically altered unit dose container.

According to another embodiment of the invention, a household appliance for treating at least one item according to a cycle of operation includes a treating chamber for receiving the at least one item for treatment according to the cycle of operation, a treating chemistry dispenser configured to receive a unit dose container providing a supply of treating chemistry for dispensing into the treating chamber, a cutter cutting at least a portion of the unit dose container to define a cut portion on the unit dose container, and a sensor providing an output indicative of a presence in the treating chemistry dispenser of a unit dose container with a cut portion.

DESCRIPTION OF EMBODIMENTS OF THE INVENTION

Figure 1:
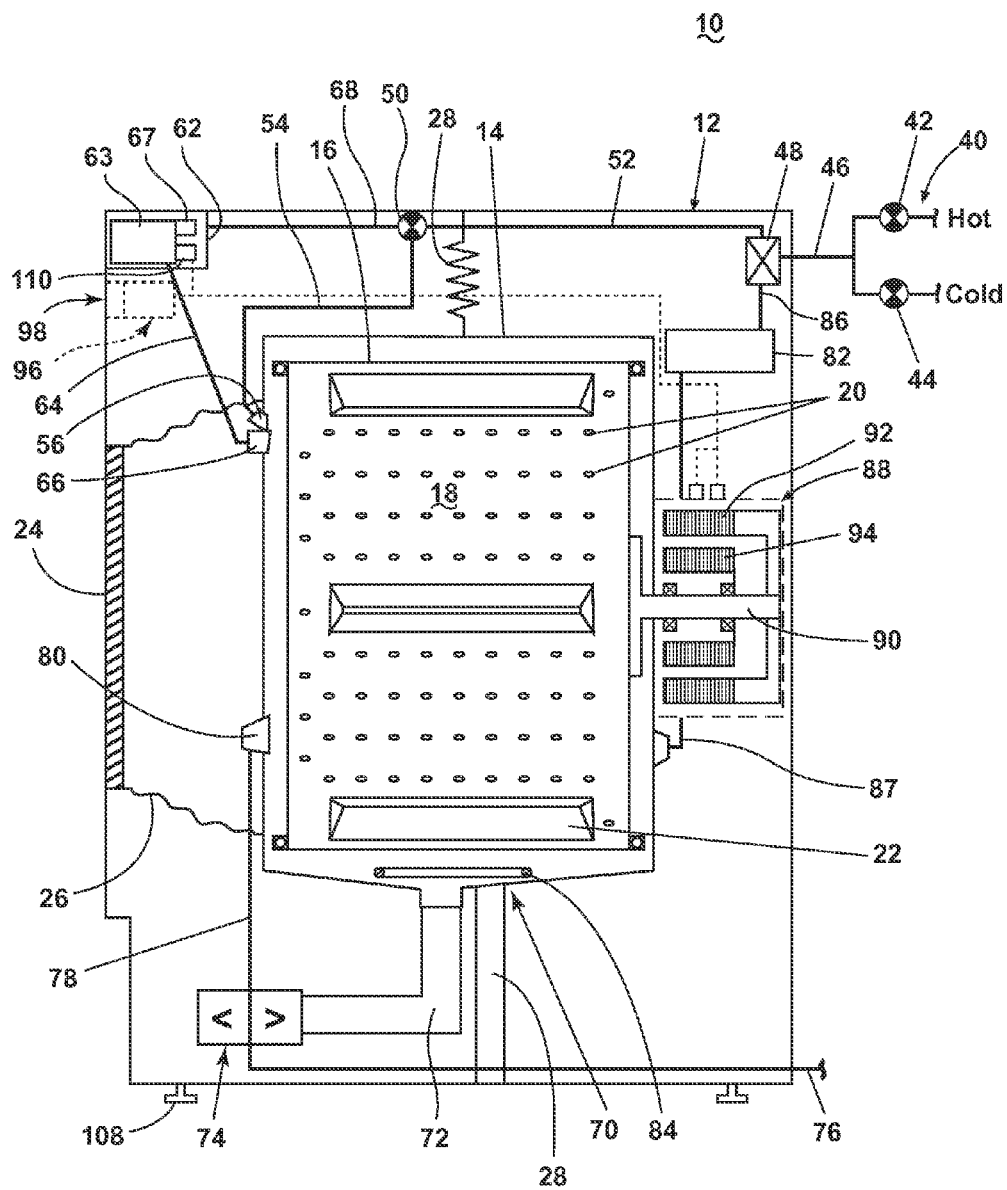
FIG. 1 is a schematic view of a household appliance in the form of a washing machine according to a first embodiment of the invention.

FIG. 1 is a schematic view of a household appliance in the form of a laundry treating appliance according to a first embodiment of the invention. The laundry treating appliance may be any appliance which includes a dispensing system capable of dispensing chemistry from a dose container, such as a single or unit dose container, and having a treating chamber for receiving at least one item for treatment according to the cycle of operation and performs a cycle of operation to clean or otherwise treat items placed therein, non-limiting examples of which include a horizontal or vertical axis clothes washer; a combination washing machine and dryer; a dispensing dryer; a tumbling or stationary refreshing/revitalizing machine; an extractor; a non-aqueous washing apparatus; and a revitalizing machine.

The laundry treating appliance of FIG. 1 is illustrated as a washing machine 10, which may include a structural support system comprising a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system comprises a tub 14 supported within the cabinet 12 by a suitable suspension system and a drum 16 provided within the tub 14, the drum 16 defining at least a portion of a laundry treating chamber 18. The drum 16 may include a plurality of perforations 20 such that liquid may flow between the tub 14 and the drum 16 through the perforations 20. A plurality of baffles 22 may be disposed on an inner surface of the drum 16 to lift the laundry load received in the treating chamber 18 while the drum 16 rotates. It is also within the scope of the invention for the laundry holding system to comprise only a tub with the tub defining the laundry treating chamber.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14.

The washing machine 10 may further include a suspension system 28 for dynamically suspending the laundry holding system within the structural support system.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a treating chemistry dispenser 62 which may be a single use dispenser or a combination of a single use dispenser and a bulk dispenser. Non-limiting examples of suitable dispensers are disclosed in U.S. Pub. No. 2010/0000022 to Hendrickson et al., filed Jul. 1, 2008, entitled "Household Cleaning Appliance with a Dispensing System Operable Between a Single Use Dispensing System and a Bulk Dispensing System," U.S. Pub. No. 2010/0000024 to Hendrickson et al., filed Jul. 1, 2008, entitled "Apparatus and Method for Controlling Laundering Cycle by Sensing Wash Aid Concentration," U.S. Pub. No. 2010/0000573 to Hendrickson et al., filed Jul. 1, 2008, entitled "Apparatus and Method for Controlling Concentration of Wash Aid in Wash Liquid," U.S. Pub. No. 2010/0000581 to Doyle et al., filed Jul. 1, 2008, entitled "Water Flow Paths in a Household Cleaning Appliance with Single Use and Bulk Dispensing," U.S. Pub. No. 2010/0000264 to Luckman et al., filed Jul. 1, 2008, entitled "Method for Converting a Household Cleaning Appliance with a Non-Bulk Dispensing System to a Household Cleaning Appliance with a Bulk Dispensing System," U.S. Pub. No. 2010/0000586 to Hendrickson, filed Jun. 23, 2009, entitled "Household Cleaning Appliance with a Single Water Flow Path for Both Non-Bulk and Bulk Dispensing," and application Ser. No. 13/093,132, filed Apr. 25, 2011, entitled "Method and Apparatus for Dispensing Treating Chemistry in a Laundry Treating Appliance," which are herein incorporated by reference in full.

Regardless of the type of dispenser used, the treating chemistry dispenser 62 may be configured to receive a unit dose container 63 providing a supply of treating chemistry for dispensing into the treating chamber 18. By way of non-limiting example, the unit dose container 63 may be received in a drawer (not shown) of the treating chemistry dispenser 62, and, more specifically, within a manual dispensing cup of the drawer. The treating chemistry dispenser 62 may dispense a treating chemistry directly to the tub 14 or the treating chamber 18 or may be mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the treating chemistry dispenser 62 from the supply conduit 52 by directing the diverter mechanism 50 to direct the flow of water to a dispensing supply conduit 68.

The unit dose container 63 may include any suitable unit dose container 63 including a cartridge formed from a rigid, semi-rigid, and/or flexible material, such as, for example, polypropylene, polyethylene, high density polyethylene, low density polyethylene, and/or polyethylene terephthalate. The unit dose container 63 may include any suitable shape, such as, for example, a cube, a tetrahedron, a prism, a cylinder, a sphere, a cone, a torus, a pyramid and any combination thereof. Non-limiting examples of treating chemistries that may be contained in the unit dose container 63 for use in the washing machine 10 may include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

A physical alteration element, which may be any suitable physical alteration element and will be initially illustrated in the form of a cutter 67 may be provided in or adjacent the treating chemistry dispenser 62 and may be configured to physically alter, such as through cutting, at least a portion of the unit dose container 63. The cutter 67 may be any suitable mechanism capable of physically altering the unit dose container 63. By way of non-limiting example, the cutter 67 may include a shearer or a piercer both of which may be used to alter the unit dose container 63. A blocking plate or other mechanism (not shown) may be used to prevent a user from accessing the cutter 67.

The washing machine 10 may also include a recirculation and drain system for recirculating liquid within the laundry holding system and draining liquid from the washing machine 10. Liquid supplied to the tub 14 through tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88, which may be directly coupled with the drum 16 through a drive shaft 90 to rotate the drum 16 about a rotational axis during a cycle of operation. The motor 88 may be a brushless permanent magnet (BPM) motor having a stator 92 and a rotor 94. Alternately, the motor 88 may be coupled to the drum 16 through a belt and a drive shaft to rotate the drum 16, as is known in the art. Other motors, such as an induction motor or a permanent split capacitor (PSC) motor, may also be used. The motor 88 may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that is operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. The specific type of controller is not germane to the invention. It is contemplated that the controller is a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
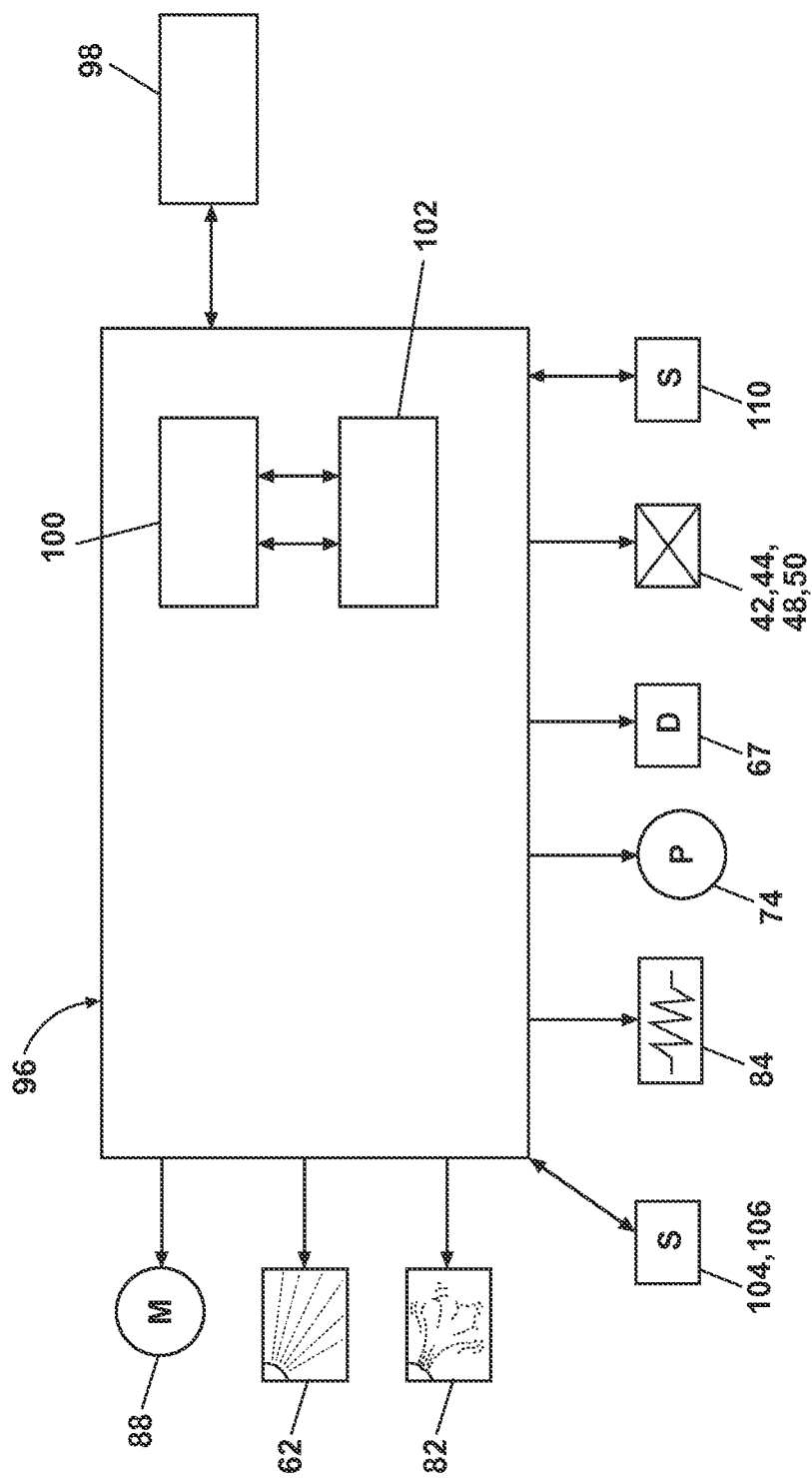
FIG. 2 is a schematic of a control system of the household appliance of FIG. 1.

As illustrated in FIG. 2, the controller 96 may be provided with a memory 100 and a central processing unit (CPU) 102. The memory 100 may be used for storing the control software that is executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the treating chemistry dispenser 62, the steam generator 82 and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor and a motor torque sensor, which may be used to determine a variety of system and laundry characteristics, such as laundry load inertia or mass.

In one example, one or more load amount sensors 106 may also be included in the washing machine 10 and may be positioned in any suitable location for detecting the amount of laundry, either quantitative (inertia, mass, weight, etc.) or qualitative (small, medium, large, etc.) within the treating chamber 18. By way of non-limiting example, it is contemplated that the amount of laundry in the treating chamber may be determined based on the weight of the laundry and/or the volume of laundry in the treating chamber. Thus, the one or more load amount sensors 106 may output a signal indicative of either the weight of the laundry load in the treating chamber 18 or the volume of the laundry load in the treating chamber 18.

The one or more load amount sensors 106 may be any suitable type of sensor capable of measuring the weight or volume of laundry in the treating chamber 18. Non-limiting examples of load amount sensors 106 for measuring the weight of the laundry may include load volume, pressure, or force transducers which may include, for example, load cells and strain gauges. It has been contemplated that the one or more such sensors 106 may be operably coupled to the suspension system 28 to sense the weight borne by the suspension system 28. The weight borne by the suspension system 28 correlates to the weight of the laundry loaded into the treating chamber 18 such that the sensor 106 may indicate the weight of the laundry loaded in the treating chamber 18. In the case of a suitable sensor 106 for determining volume it is contemplated that an IR or optical based sensor may be used to determine the volume of laundry located in the treating chamber 18.

Alternatively, it has been contemplated that the washing machine 10 may have one or more pairs of feet 108 extending from the cabinet 12 and supporting the cabinet 12 on the floor and that a weight sensor (not shown) may be operably coupled to at least one of the feet 108 to sense the weight borne by that foot 108, which correlates to the weight of the laundry loaded into the treating chamber 18. In another example, the amount of laundry within the treating chamber 18 may be determined based on motor sensor output, such as output from a motor torque sensor. The motor torque is a function of the inertia of the rotating drum and laundry. There are many known methods for determining the load inertia, and thus the load mass, based on the motor torque. It will be understood that the details of the load amount sensors are not germane to the embodiments of the invention and that any suitable method and sensors may be used to determine the amount of laundry.

Further, a sensor 110 may also be included in the washing machine 10 and may be positioned in any suitable location for detecting a physical alteration of the unit dose container 63. The sensor 110 may provide an output indicative of a presence in the treating chemistry dispenser 62 of a unit dose container 63, which has been physically altered.

Prior to operation of the washing machine 10, a user may load a new, full unit dose container 63 into the treating chemistry dispenser 62. During operation of a cycle of operation of the washing machine 10, the cutter 67 may physically alter the unit dose container 63 by cutting a portion of the unit dose container 63. Physically altering a portion of the unit dose container 63 with the cutter 67 may include forming a less stiff portion of the unit dose container 63, reducing a structural integrity of at least a portion of the unit dose container, completely removing a portion of the unit dose container 63, or severing a portion of the unit dose container 63. For example, the cutter 67 may be used to cut the unit dose container 63 to form a less stiff portion, the sensor 110 may sense that the unit dose container 63 has been physically altered by sensing the less stiff portion. More specifically, the less stiff portion may be contacted by a pressure switch when the unit dose container 63 is received within the treating chemistry dispenser 62. In the case where a structural integrity of a portion of the unit dose container 63 is reduced, sensing the physical alteration may include sensing a rigidity of at least a portion of the unit dose container 63. In the case where a portion of the unit dose container 63 is destroyed or removed, sensing the physical alteration may include sensing an absence of the portion.

It is contemplated that the unit dose container 63 may include a portion that is electrically conductive and that during the initial use of the unit dose container 63 the unit dose may be physically altered along the electrical conductor. More specifically, the electrical conductor provided on the unit dose container may be severed. In this manner, the physical alteration element may physically alter a conductance of at least a portion of the unit dose container 63. In such an instance, sensing the physical alteration may include sensing a conductance of at least a portion of the unit dose container 63. Alternatively, physically altering the unit dose container 63 may include piercing a portion of the unit dose container 63 such as a film forming a portion of the unit dose container 63. The dispensing of the treating chemistry from the unit dose container 63 may include dispensing at least a portion of the treating chemistry through the physical alteration formed by piercing the unit dose container 63. In such an instance sensing the physical alteration may include sensing the physical alteration of the unit dose container 63 caused by the piercing. This may include optically sensing the physical alteration through use of an optical sensor, which may be capable of detecting the opening formed when the unit dose container 63 is pierced. It is also contemplated that the unit dose container 63 may include a unique bar code that may be physically altered when the unit dose container 63 is pierced. If the physical alteration element is used to physically alter the bar code, the timing may be such that the bar code is scanned before the physical alteration element is activated.

It will be understood from the above that the unit dose container 63 may be physically altered in any number of ways. Although most of the above examples include destruction such as through cutting or piercing, it will be understood that the unit dose container 63 may be physically altered in a variety of alternative manners. For example, in the instance where the unit dose container 63 includes a portion that is electrically conductive, physically altering the unit dose container 63 along the electrical conductor may include adding a material to the electrical conductor to change its conductance. In such an instance sensing the physical alteration may include sensing the altered conductance of at least a portion of the unit dose container 63.

Regardless of the manner in which the unit dose container 63 is physically altered and how such alteration is sensed, it will be understood that the unit dose container may be physically altered in conjunction with a first execution of a cycle of operation. This may include altering the unit dose container 63 after sensing some portion of the unit dose container 63, altering the unit dose container before or after the treating chemistry in the unit dose container 63 is dispensed, or altering the unit dose container upon receipt of the dose container within the treating chemistry dispenser 62. After the first execution of a cycle of operation the unit dose container 63 may be removed and discarded by a user and before a second execution of a cycle of operation the user may load a new, full unit dose container 63 into the treating chemistry dispenser 62.

If the physically altered unit dose container 63 is not removed and replaced with a new unit dose container 63, the controller 96 may be configured to sense the physical alteration of the unit dose container 63 through the sensor 110 in conjunction with the second execution of the cycle of operation. In the event of a physically altered unit dose container 63 being present in the treating chemistry dispenser 62 during the second execution of the cycle of operation, the controller 96 may then provide an indication of the presence of the physically altered unit dose container 63 to the user. This may include providing an indication via the user interface 98, which may include providing at least one of a visual indication or an aural indication via the user interface 98. The controller 96 may also alternatively or in addition to an indication via the user interface 98 fail to implement the second execution of a cycle of operation. Failing to implement the second execution of a cycle of operation may include failing to proceed with the second execution of a cycle of operation or ceasing the second execution after beginning or initially implementing the second execution of a cycle of operation. While the above description discusses first and second executions of a cycle of operation it will be understood that such cycles of operation may be the same type of cycle of operation or may be differing cycles of operation.

Figure 3:
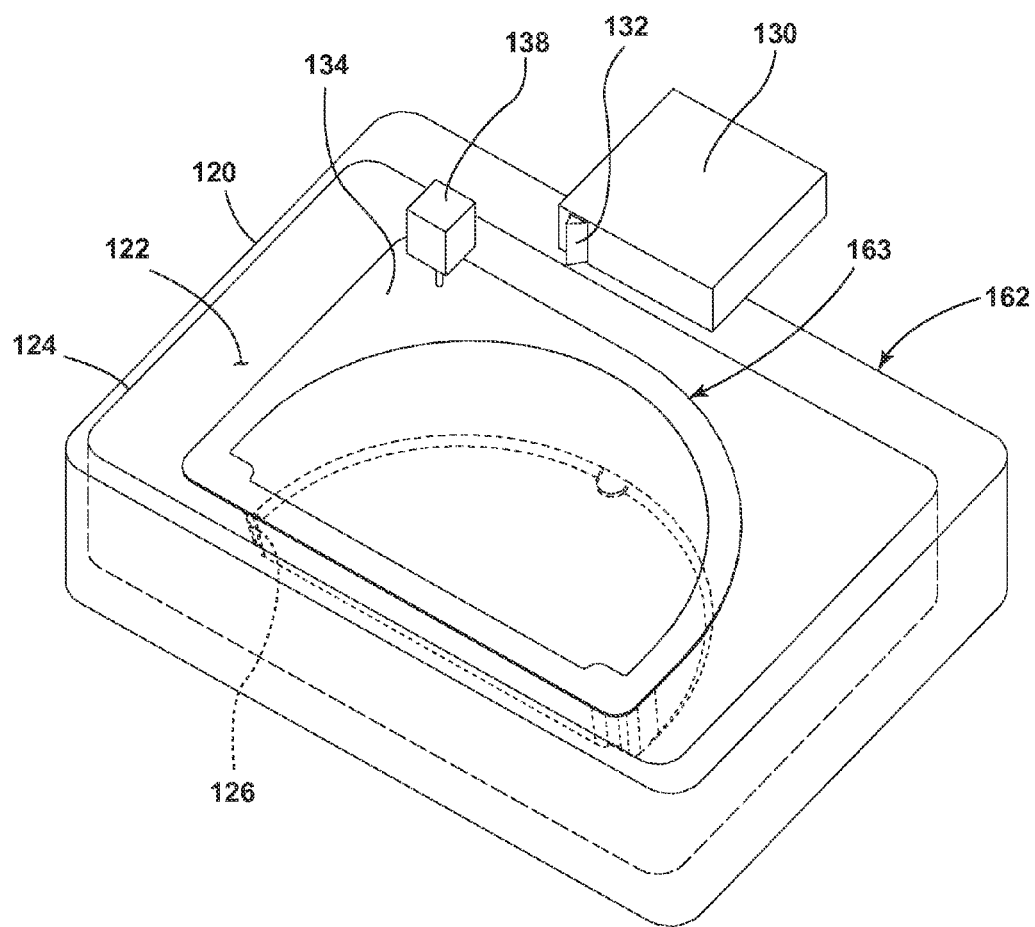
FIG. 3 is a perspective view of a portion of a treating chemistry dispenser and a unit dose container according to a second embodiment of the invention.

An exemplary embodiment of a treating chemistry dispenser 162 and a unit dose container 163 according to a second embodiment of the invention has been illustrated in FIG. 3. A housing 120 may define a compartment 122 of the treating chemistry dispenser 162. A drawer 124 with a recess 126 configured to receive the unit dose container 163 may be slidably coupled to the housing 120 and the drawer 124 may be slidable between a load position (not shown), where the unit dose container 163 may be loaded into the recess 126, and a use position, where the unit dose container 163 is positioned for dispensing within the compartment 122.

A physical alteration element, which may be in the form of any suitable physical alteration element including the illustrated shearer 130, may be located proximate to the drawer 124. The shearer 130 may be configured to shear a first portion of the unit dose container 163 when the drawer 124 is moved from the load position to the use position; this may be considered to be a portion of a first execution of a cycle of operation of the household appliance. In such an instance, the sensor 110 may detect whether there is a physical alteration of the unit dose container 163 before the physical alteration such as when the unit dose container 163 is being slid into the compartment 122.

Alternatively, it is contemplated that the shearer 130 may be operated to alter the unit dose container 163 after the drawer 124 is moved to the use position. More specifically, the unit dose 163 may be placed in the drawer 124 and when the drawer 124 is closed and upon the start of the cycle, or at least when the cycle requires the treating chemistry, the alteration may occur. For example, the shearer 130 may be operably coupled to and controlled by the controller 96, which may activate the shearer 130 after treating chemistry has been dispensed from the unit dose container 163 during implementation of the cycle of operation or to dispense treating chemistry from the unit dose container 163 during implementation of the cycle of operation. Either provides the benefit of not wasting the treating chemistry if the cycle had not progressed to the point where the chemistry is needed.

Figure 4:
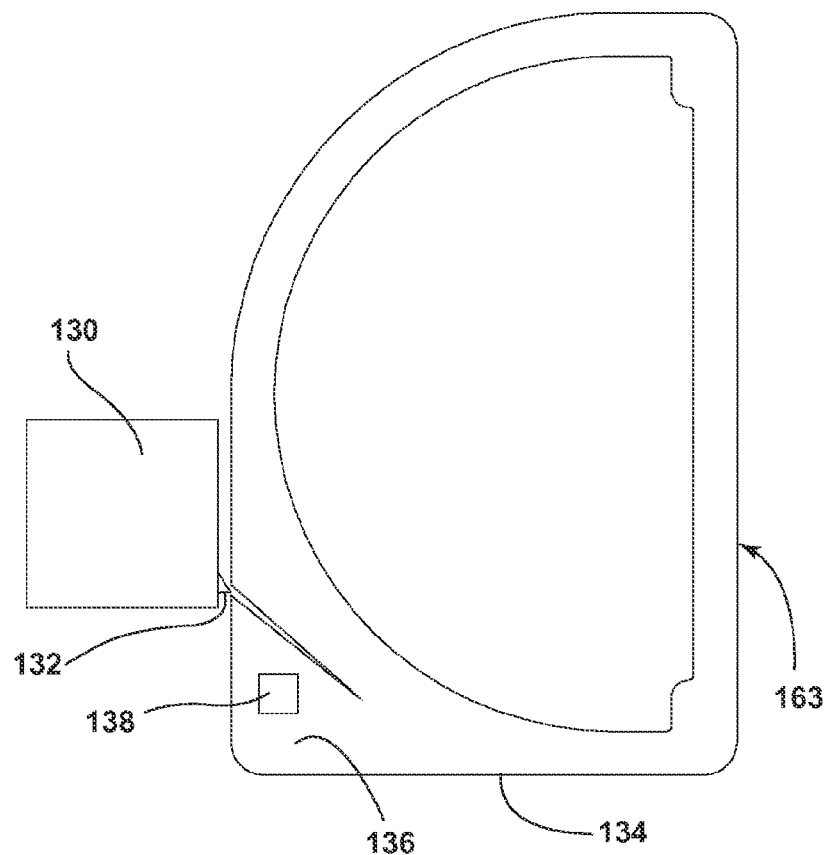
FIG. 4 is a top view of a portion of the treating chemistry dispenser and the unit dose container of FIG. 3.

For example, the controller 96 may operate the shearer 130 such that a shearing element 132, as shown in FIG. 4, may be extended from the shearer 130 to physically alter a portion of the unit dose container 163. The unit dose container 163 may include a flange 134 and the shearer 130 may be located proximate the drawer 124 to cut a portion of the flange 134 on the unit dose container 163 to form a cut portion 136.

Figure 5:
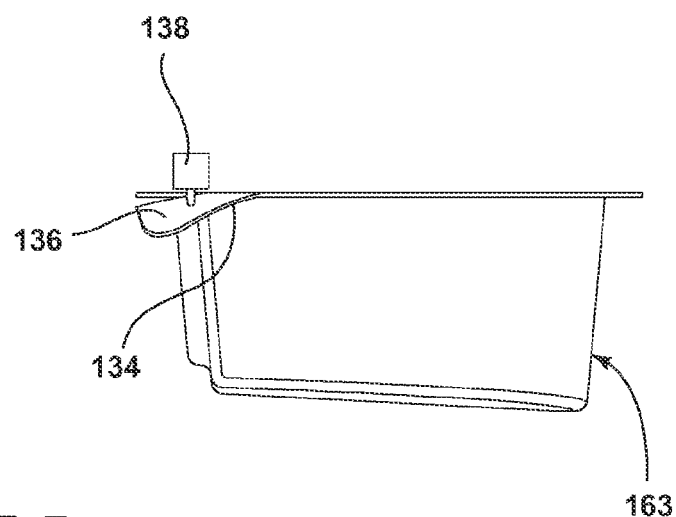
FIG. 5 is a side view of the unit dose container and a sensor of the treating chemistry dispenser of FIG. 3.

As shown in FIG. 5, the sensor 110 has been illustrated as a force sensor 138, which may contact a portion of the unit dose container 163 and determine a physical alteration thereof. More specifically, the force sensor 138 contacts the cut portion 136 and may provide an output indicative of a contact force between the force sensor 138 and the cut portion 136. In this manner the force sensor 138 may sense a structural weakening of the unit dose container 163 resulting from the formation of the cut portion 136.

By way of non-limiting example, the force sensor 138 may be a pressure switch such as a spring biased switch applying a biasing force to the unit dose container 163 when the force sensor 138 is in contact with the unit dose container 163. The spring biased switch of the force sensor 138 may be operable between opened and closed states and the biasing force may be great enough to deflect the cut portion 136 and change the state of the spring biased switch of the force sensor 138. The output of the force sensor 138 may be indicative of at least one of the opened and closed states and the controller 96 may receive such output. The controller 96 may be programmed to cease the implementation of the cycle of operation when the output is indicative of a unit dose container having a cut portion.

It is also contemplated that the sensor 110 or an alternative sensor may also be used to sense a presence of the unit dose container 163. The output from the sensor may be used by the controller 96 to unlock a feature, such as a blocking plate, which prevents sharp features such as the shearing element 132, from being exposed unless the appropriate unit dose container 163 is inserted.

In operation, the unit dose container 163, as initially inserted into the treating chemistry dispenser 162, must have an intact flange 134 with no cut portion before the controller 96 will proceed with the cycle of operation. The controller 96 senses the presence of the intact flange 134 and dispenses the treating chemistry from inside the unit dose container 163. This may be done by any suitable method including by puncturing the unit dose container 163. As the unit dose container is punctured, the shearer 130 is activated to cut the flange 134 and physically alter the flange's ability to activate the switch. In this manner, the flange 134 of the unit dose container 163 is physically altered with a cut portion 136 with a first execution of the cycle of operation. Subsequent reuse of the unit dose container 163 having the cut portion 136 in a second execution of a cycle of operation is prevented because the flange 134 is no longer capable of activating the force sensor 138 and the controller 96 may then provide an indication of the presence of the physically altered unit dose container 163 to the user.

By way of further non-limiting example, an alternative cutter may be used to cut a top portion of the unit dose container 163. In such an instance, sensing the physical alteration may include sensing the cutting force used to cut a top of the unit dose container 163 and the sensor 110 may output an indication of the same. The controller 96 may then determine whether the unit dose container 163 has been physically altered by comparing the sensed cutting force to a predetermined cutting force. By way of non-limiting example, this alternative cutting mechanism may be a needle used to pierce the top film of the unit dose container 163 and subsequently extract the chemistry from within the unit dose container 163.

Thus, it will be understood that embodiments of this invention may have a variety of physical features of the unit dose container and such features may be modified in any suitable way during a first use of the unit dose container and that the sensor may be able to tell whether the feature has been modified or not in any suitable manner. Regardless of the physical feature and sensor used, during initial use of the unit dose container, the physical feature is intact and is able to activate the switch, indicating that the unit dose container is present. When the unit dose is used for the first time, this physical feature is altered in a way which does not allow it to activate the switch if attempts are made to reuse the container. For example, the physical feature may be cut, bent, broken, or otherwise physically altered to inhibit the physical feature's ability to activate the sensor. In this way, the appliance is able to verify that the unit dose container is present and has not been used previously.

Figure 6:
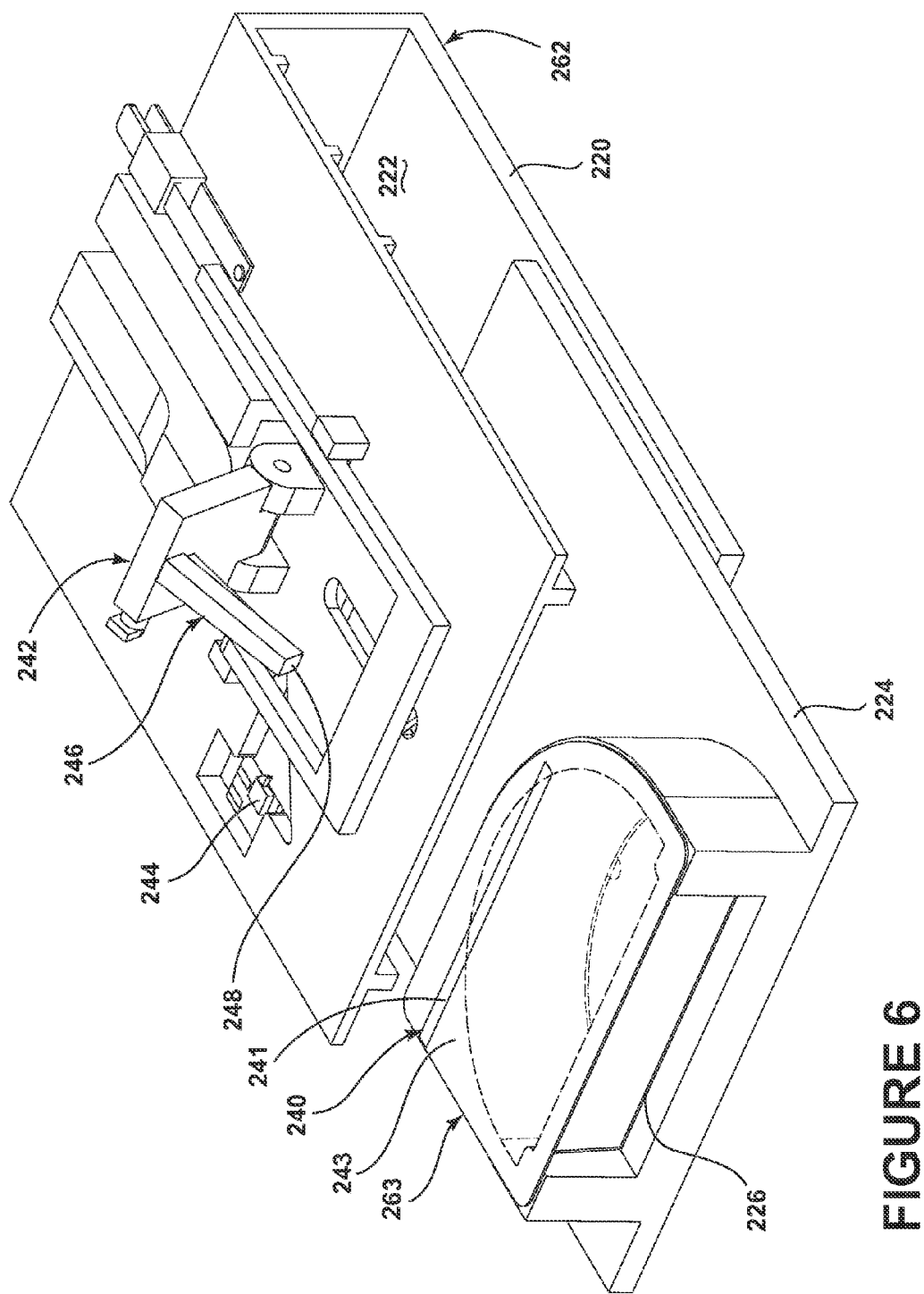
FIG. 6 is a perspective view of a portion of a treating chemistry dispenser and a unit dose container according to a third embodiment of the invention with a drawer of the treating chemistry dispenser in a load position.

By way of further example, FIG. 6 illustrates a portion of a treating chemistry dispenser 262 and a unit dose container 263 according to a third embodiment of the invention wherein an electrically conductive element 240 may be included on the unit dose container 263 and the unit dose container 263 may be physically altered by a physical alteration element 242 located proximate to the treating chemistry dispenser 262 and operable to physically alter at least a portion of the electrically conductive element 240. By way of example, the electrically conductive element 240 has been illustrated as including a conductive strip 241 on the unit dose container 263. It is contemplated that the conductive strip 241 may be located on a non-conductive film 243 of the unit dose container 263. Alternatively, both may be conductive and the conductive strip 241 may have a resistance different from the film 243 covering the top of the unit dose container 263.

Figure 7:
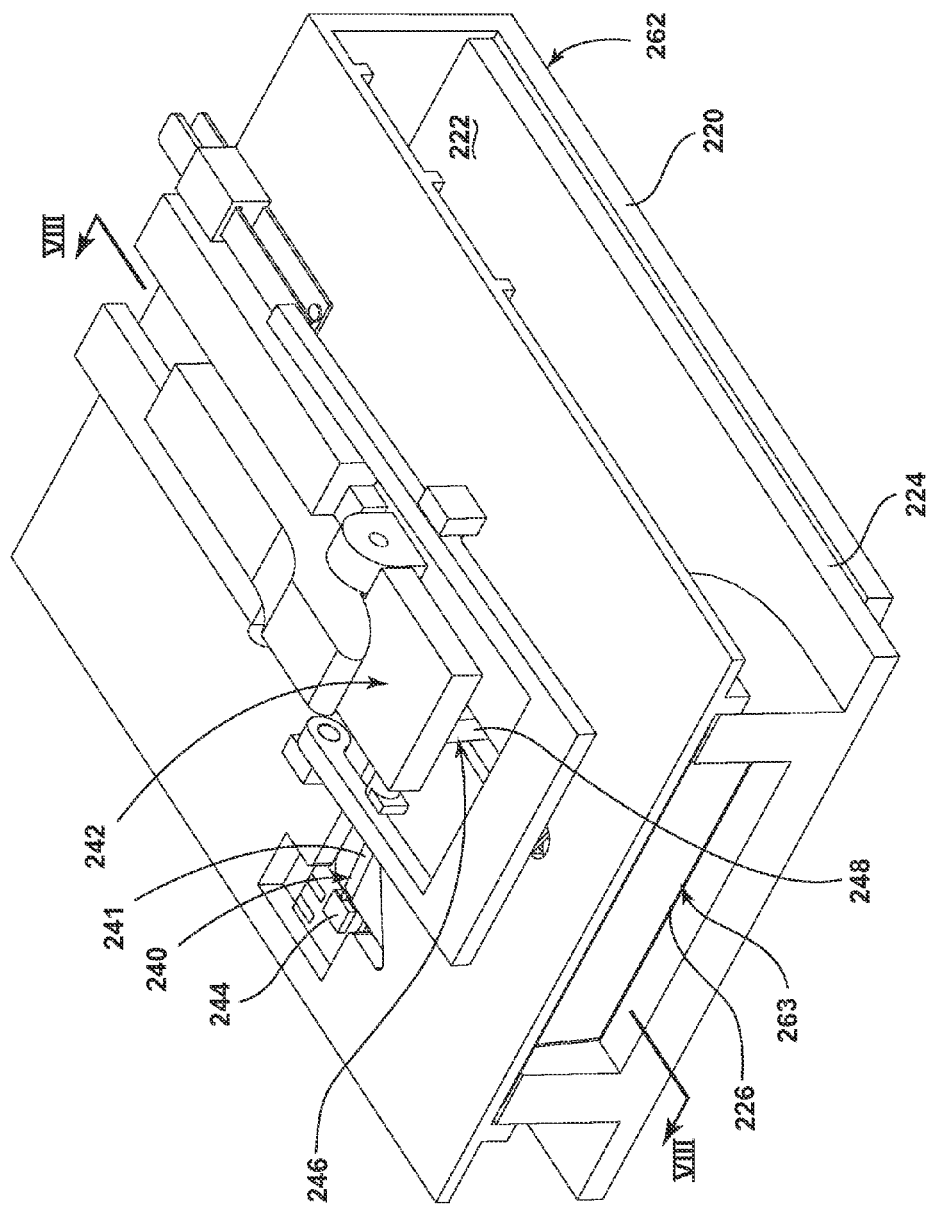
FIG. 7 is a perspective view of a portion of the treating chemistry dispenser and the unit dose container of FIG. 6 with the drawer in a use position.

A drawer 224 may be included as a portion of the treating chemistry dispenser 262 and may be slidable between a load position, as illustrated in FIG. 6, where the unit dose container 263 may be loaded into the drawer 224, and a use position (FIG. 7), where the unit dose container 263 is positioned for dispensing. In the use position, the unit dose container 263 may be adjacent the physical alteration element 242, which has been illustrated in the form of a piercer 246. The piercer 246 may be operable to perforate the unit dose container 263 at the location of the electrically conductive element 240. The piercer 246 includes a piercing element 248 movable between a non-piercing position (FIG. 6), where the piercing element 248 resides exteriorly of the unit dose container 263 and a piercing position (FIG. 7), where the piercing element 248 extends through the electrically conductive element 240 and into the unit dose container 263.

The sensor 110 may include a conductance sensor or electrical sensor 244, which provides an output indicative of an electrical characteristic of the of unit dose container 263. For example, the output may be indicative of an electrical characteristic, such as resistance or conductance, of the unit dose container 263 at a location where the piercing element extends through the unit dose container 263. In the illustrated embodiment the electrical sensor 244 is located proximate the unit dose container 263 to electrically sense a characteristic of electricity flowing through the electrically conductive element 240 and provide an output indicative of the characteristic.

During operation, the controller 96 may determine if the unit dose container 263 is new and not used. This may include applying an electrical potential between the two ends of the conductive strip 241 and sensing the electrical current through the conductive strip 241 produced by the electric potential applied between the two end of the conductive strip 241 to thereby sense the conductance between the two ends of the conductive strip 241, such as at the location of the electrical sensor 244. In determining whether the unit dose container 263 has been physically altered, the controller 96 may compare the sensed conductance to a reference conductance. When the sensed conductance differs from the reference conductance it may be determined that the unit dose container 263 has been physically altered and the controller 96 may indicate the same to the user. Alternatively, if the electrically conductive element 240 is intact, it may close the circuit of the electrical sensor 244, which then outputs the indicative signal to the controller 96.

Figure 8:
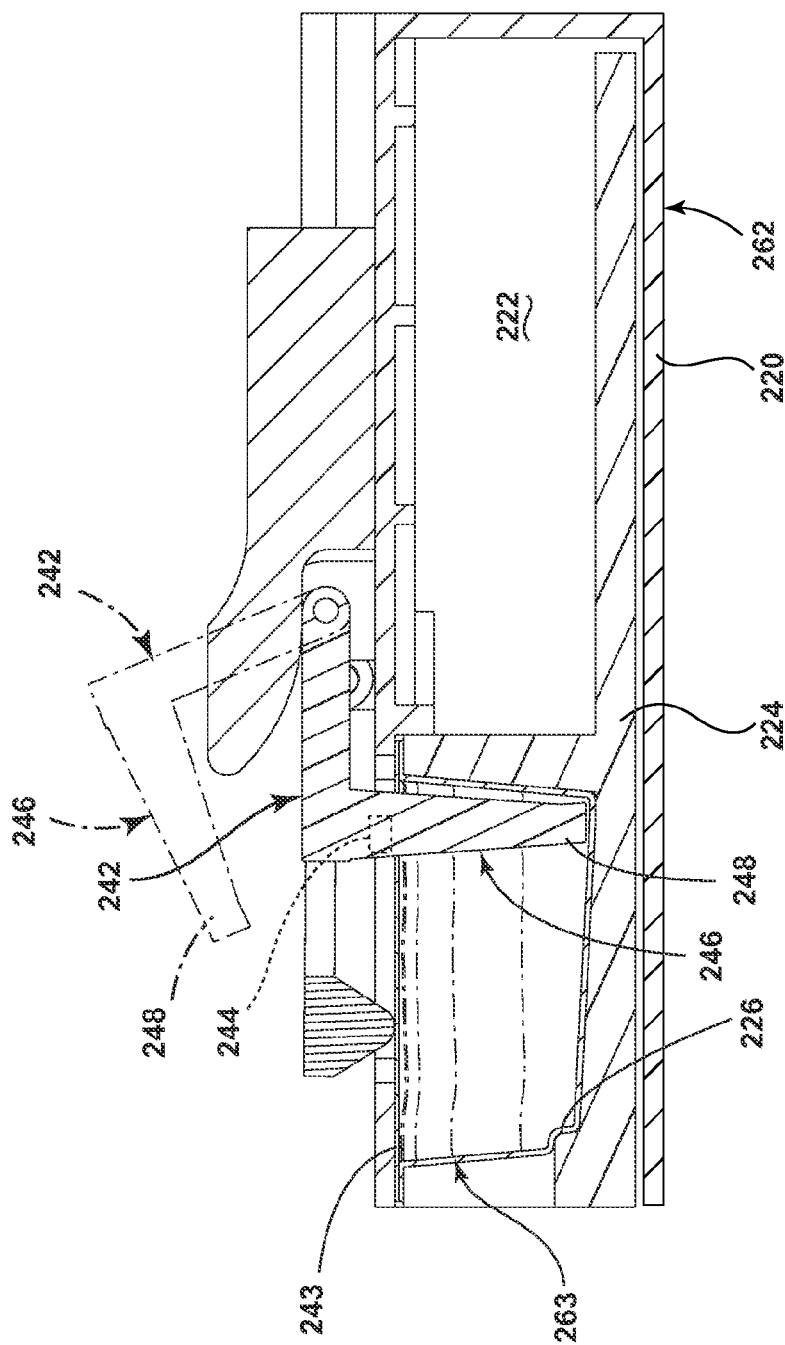
FIG. 8 is a cross-sectional view of the treating chemistry dispenser and the unit dose container of FIG. 7, taken along the line VIII-VIII.

As illustrated in FIG. 8, the controller 96 may activate the piercer 246 and move it from the non-piercing position (shown in phantom) to the piercing position (shown in solid line), after the treating chemistry is dispensed from the unit dose container 263 during implementation of the at least one cycle of operation. Alternatively, the unit dose container 263 may be pierced to access the treating chemistry and during this piercing the electrically conductive element 240 may be pierced. It is contemplated that to prevent the circumvention of this verification process through the use of a foil over a previously used unit dose container 263, which would continue to provide continuity in subsequent reuses, the conductance must not be present in order for the cycle to continue beyond the actuation of the piercer 246.

Regardless of when the piercer 246 is activated, it is contemplated that the piercer 246 may sufficiently physically alter the electrically conductive element 240 to electrically open the electrically conductive element 240. This may include the piercer 246 completely severing the electrically conductive element 240. Once the strip has been severed, subsequent reuse of the unit dose container is prevented because the electrical sensor 244 cannot detect the presence of the unit dose container 263 and the controller may then provide an indication of the presence of the physically altered unit dose container 263 to the user.

It is contemplated that an alternative unit dose container and sensor may be used with respect to the above described embodiment and that reuse may be prevented by only allowing the cycle of operation to start or proceed if the piercing element 248 does not drop into the tear when the unit dose container is fully inserted within the treating chemistry dispenser 262. The movement of the piercing element 248 may be sensed and if the piercing element 248 falls into the tear then the sensor may output an indication of the same. This ensures only new doses can be used. As yet another alternative, the sensor may include a force sensor providing an output indicative of the force to move the piercing element from the non-piercing position to the piercing position. If the unit dose container 263 has already been pierced, the output from the sensor will indicate less force and the controller 96 may operate the appliance accordingly. Further, it is also contemplated that an alternative sensor may be used to sense a presence of the unit dose container 263. Such a sensor output may ensure that the drawer 224 is fully closed and that a unit dose container 263 is present before allowing the further execution of the cycle of operation.

Figure 9:
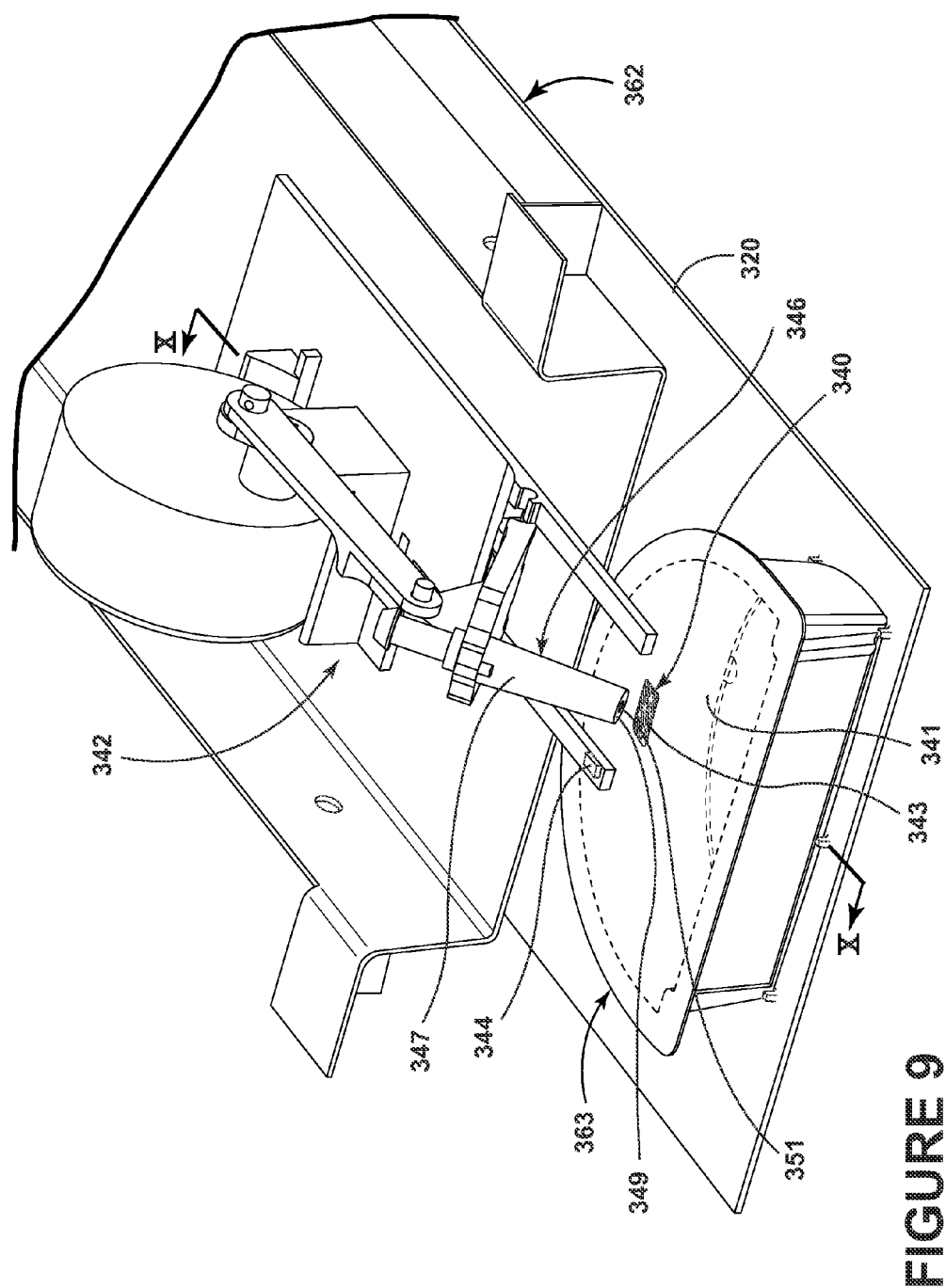
FIG. 9 is a perspective view of a portion of a treating chemistry dispenser and a unit dose container according to a fourth embodiment of the invention with a piercer in a non-piercing position.

FIG. 9 illustrates a portion of a treating chemistry dispenser 362 and a unit dose container 363 according to a fourth embodiment of the invention, wherein the unit dose container 363 includes an optically sensible element 340 and the physical alteration element 342 may include a piercer 346 operable to physically alter at least a portion of the optically sensible element 340. In this embodiment the unit dose container 362 may be received within the housing 322. The optically sensible element 340 may include a film 341, which may be sensed by an optical sensor 344. It is contemplated that the optically sensible element 340 may include indicia 343 on the film 341 of the unit dose container 362. The indicia 343 may have a reflectance different from an adjacent portion of the unit dose container 362. The indicia 343 may be printed on the film 341 of the unit dose container 362 in the location where the piercer 346 will pierce the film 341. In this way, the indicia 343 are only intact up until the point when the unit dose container 363 is used for the first time.

Figure 10:
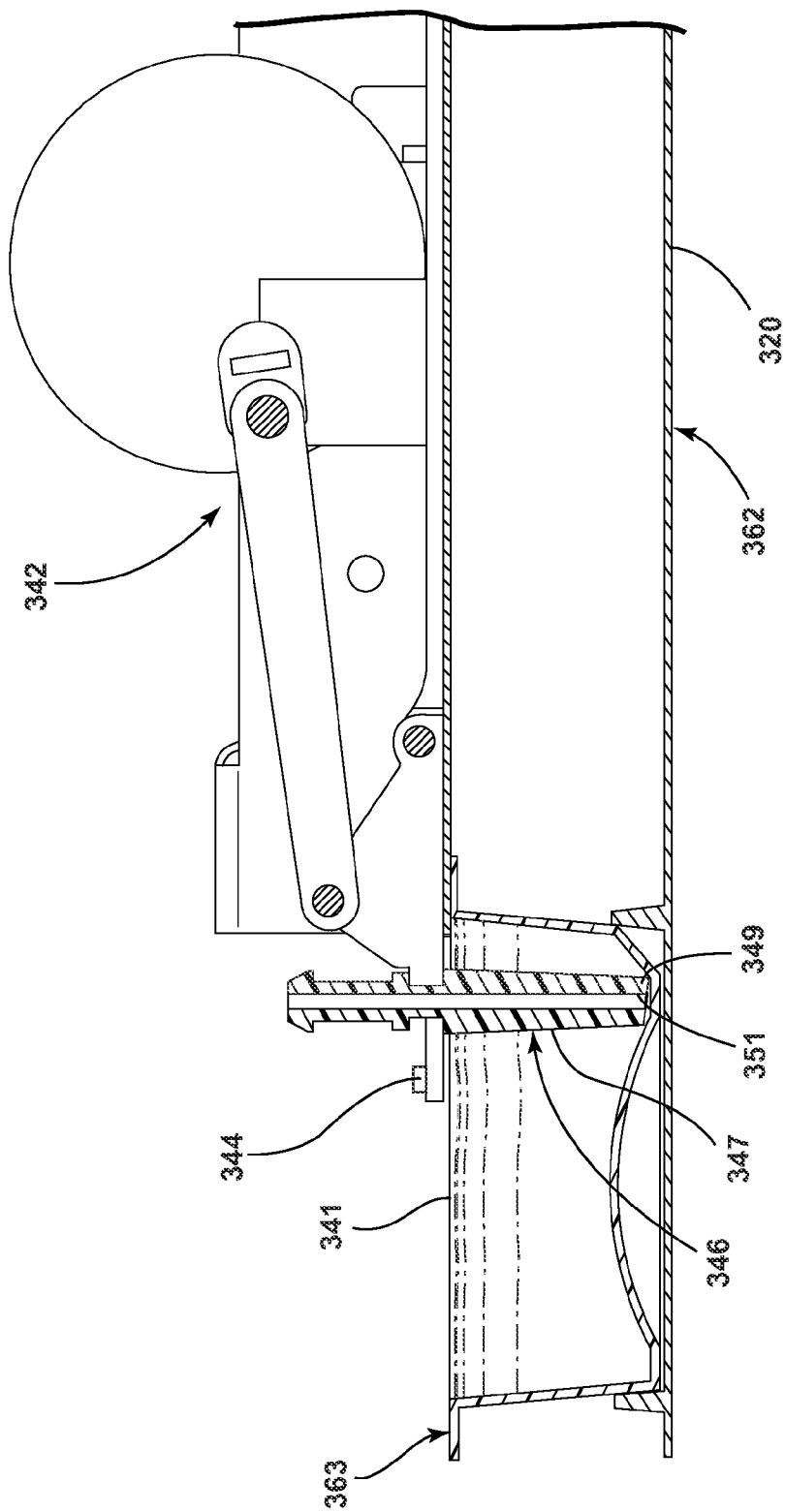
FIG. 10 is a perspective view of a portion of the treating chemistry dispenser and the unit dose container of FIG. 9, taken along the line X-X, with the piercer in a piercing position.

The piercer 346 is operable to perforate or pierce the unit dose container 362 at the location of the optically sensible element 340. The piercer includes a piercing element 347 movable between a non-piercing position as shown in FIG. 9 and a piercing position as shown in FIG. 10. In the non-piercing position, the piercing element 347 resides exteriorly of the unit dose container 362. In the piercing position, the piercing element 347 extends through the optically sensible element 340 and into the unit dose container 362. The piercing element 347 may include any suitable form and has been illustrated as a needle 349 having a hollow interior 351 through which the treating chemistry may be withdrawn from the unit dose container 362. The treating chemistry dispenser 362 may include a pump (not shown) fluidly coupled to the hollow interior 351 of the needle 349 to pump the treating chemistry from the unit dose container 362.

The optical sensor 344 may be located proximate the unit dose container 362 to optically sense a presence of the optically sensible element 340. The optical sensor 344 may be any suitable optical sensor 344 including for example a photodiode or an imaging device such as a camera. Other optical sensors 344 may include absorption/transmission spectroscopy, total internal reflection spectroscopy, and index of refraction. The optical sensor 344 is operably coupled to and controlled by the controller 96 and provide an output indicative of the presence of the optically sensible element 340

The controller 96 in implementing the at least one cycle of operation and receiving the output from the optical sensor 344 may determine if the unit dose container 363 has been previously pierced. If it has not, treating chemistry may be dispensed from the unit dose container 363 during implementation of the at least one cycle of operation and the controller 96 may activates the piercer 346. The piercer 346 may sufficiently physically alter enough of the optically sensible element 340. If the unit dose container 362 is reused for a subsequent cycle of operation, the optical sensor 344 may provide an output indicative of a presence of a piercing in the unit dose container 362 or indicative of the physical alteration of the optically sensible element 340. The controller 96 may then provide an indication of the presence of the physically altered unit dose container 362 to the user.

It is further contemplated that the indicia 343 may include a bar code type pattern, which can be registered by the optical sensor 344. The bar code type pattern may be a unique pattern printed on the film 341 of the unit dose container 362. This may allow for verification of the unit dose container 363 by the controller 96 ensuring only appropriate unit dose containers 363 are used. If the indicia 343 is a unique pattern, it may also allow for more information besides container verification to be communicated to the controller 96. For instance, if different chemistries require different cycles for optimal performance, a unique identifier may be encoded onto the unit dose container 363 and communicated to the controller 96 through the optical sensor 344. More specifically, the additional information may be at least one of chemistry identification, operating parameter, a phase of a cycle, or a complete cycle. Requiring a valid code in order to activate the appliance may also act as a mechanism to ensure the physical alteration element cannot be accessed by the user.

It will be understood that unit dose container may have any suitable shape and attributes and may be physically altered in any number of manners and that such physical alteration may be sensed in any corresponding suitable way.

Figure 11:
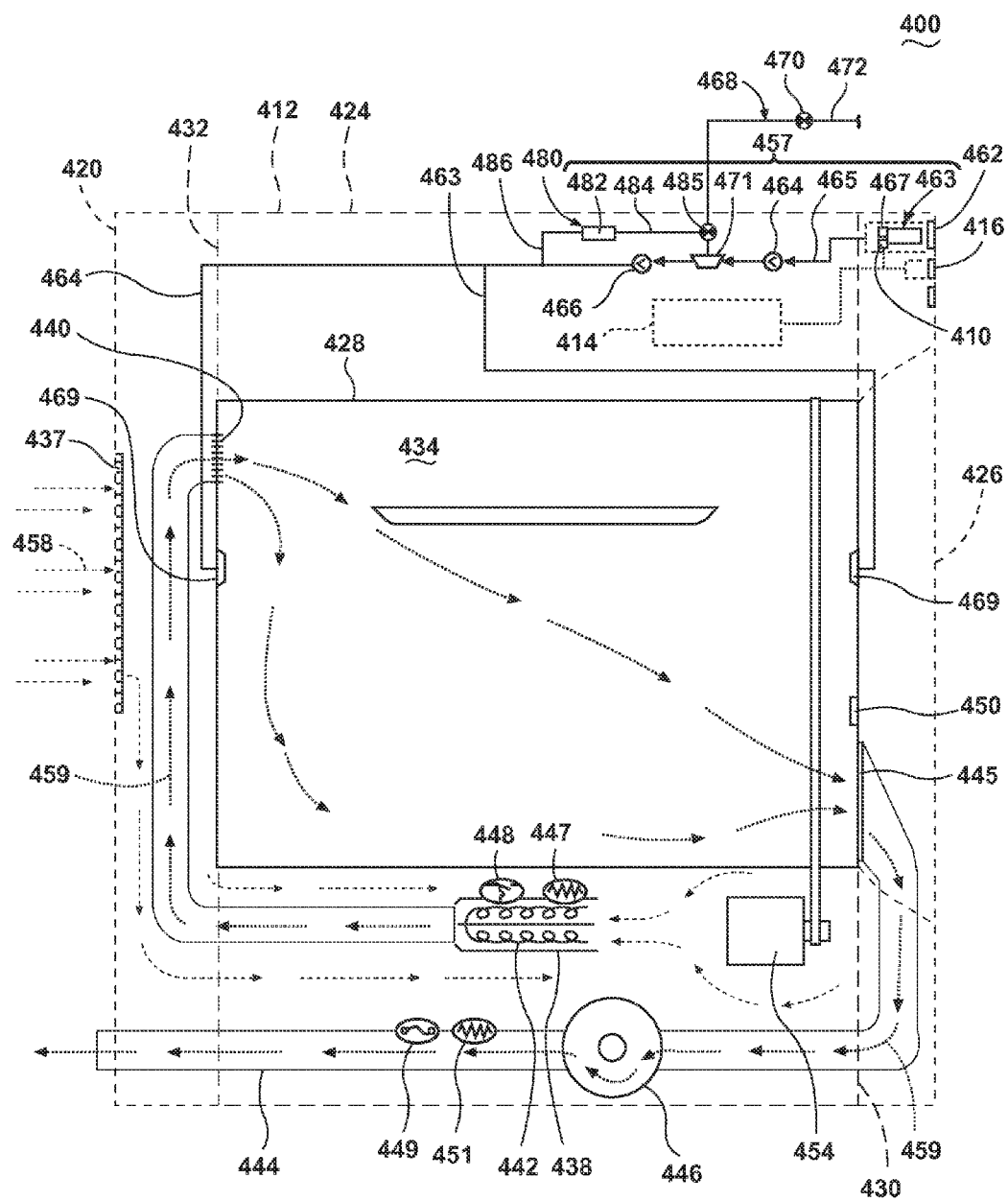
FIG. 11 is a schematic view of a household appliance in the form of a dispensing dryer according to a fifth embodiment of the invention.

It will also be understood that any of the above treating chemistry dispensers, cutters, and sensors may be employed in alternative household appliances. For example, FIG. 11 illustrates another household appliance in the form of a dispensing dryer 400 that may be controlled according to embodiments of the invention. The dispensing dryer 400 described herein shares many features of a traditional clothes dryer, which will not be described in detail except as necessary for a complete understanding of the invention. The dispensing dryer 400 may include a cabinet 412 in which is provided a controller 414 that may receive input from a user through a user interface 416 for selecting a cycle of operation and controlling the operation of the dispensing dryer 400 to implement the selected cycle of operation. The user interface 416 may include operational controls such as dials, lights, switches, and displays enabling a user to input commands, such as a cycle of operation, to the controller 414 and receive information such as an indication of the presence of a physically altered unit dose container.

A rotatable drum 428 may be disposed within the interior of the cabinet 412 between opposing stationary front and rear bulkheads 430, 432, which, along with the a door 426, collectively define a treating chamber in the form of a laundry drying chamber 434 for treating laundry. As illustrated, and as is the case with most clothes dryers, the treating chamber 434 is not fluidly coupled to a drain. Thus, any liquid introduced into the treating chamber 434 may not be removed merely by draining. Non-limiting examples of laundry that may be treated according to a cycle of operation include, a hat, a scarf, a glove, a sweater, a blouse, a shirt, a pair of shorts, a dress, a sock, a pair of pants, a shoe, an undergarment, and a jacket. Furthermore, textile fabrics in other products, such as draperies, sheets, towels, pillows, and stuffed fabric articles (e.g., toys), may be treated in the clothes dryer 400. The drum 428 may be operably coupled with a motor 454 to selectively rotate the drum 428 during a cycle of operation.

An air system may be provided to the clothes dryer 400. The air system supplies air to the treating chamber 434 and exhausts air from the treating chamber 434. The supplied air may be heated or not. The air system may have an air supply portion that may form, in part, a supply conduit 438, which has one end open to ambient air via a rear vent 437 and another end fluidly coupled to an inlet grill 440, which may be in fluid communication with the treating chamber 434. A heating element 442 may lie within the supply conduit 438 and may be operably coupled to and controlled by the controller 414; if the heating element 442 is turned on, the supplied air will be heated prior to entering the drum 428. The air system may further include an air exhaust portion that may be formed in part by an exhaust conduit 444. A lint trap 445 may be provided as the inlet from the treating chamber 434 to the exhaust conduit 444. A blower 446 may be fluidly coupled to the exhaust conduit 444. The blower 446 may be operably coupled to and controlled by the controller 414. Operation of the blower 446 draws air into the treating chamber 434 as well as exhausts air from the treating chamber 434 through the exhaust conduit 444. The exhaust conduit 444 may be fluidly coupled with a household exhaust duct (not shown) for exhausting the air from the treating chamber 434 to the outside of the dispensing dryer 400.

The air system may further include various sensors and other components, such as a thermistor 447 and a thermostat 448, which may be used to aid in determining an inlet temperature. A thermistor 451 and a thermal fuse 449 may be coupled to the exhaust conduit 44, with the thermistor 451 being used to determine an outlet air temperature. A moisture sensor 450 may be positioned in the interior of the treating chamber 434 to monitor the amount of moisture of the laundry in the treating chamber 434.

A dispensing system 457 may be provided to dispense one or more treating chemistries to the treating chamber 434 according to a cycle of operation. The dispensing system 457 may be fluidly coupled to a water supply 468. The dispensing system 457 may be further coupled to the treating chamber 434 through one or more nozzles 469. As illustrated, the dispensing system 457 may include a treating chemistry dispenser 462, which may be provided to receive a unit dose container 563 and provide a supply of treating chemistry for dispensing into the treating chamber 434. As illustrated the treating chemistry dispenser 462 may be located in the interior of the cabinet 412 although other locations are also possible. The treating chemistry dispenser 562 may include a drawer with a recess configured to receive the unit dose container 463, the drawer being slidable between a load position, where the unit dose container 463 may be loaded into the recess, and a use position, where the unit dose container 463 is positioned for dispensing. The unit dose container 463 may include any suitable unit dose container 63 including a cartridge. The treating chemistry may be any type of aid for treating laundry, non-limiting examples of which include, but are not limited to, water, fabric softeners, sanitizing agents, de-wrinkling or anti-wrinkling agents, and chemicals for imparting desired properties to the laundry, including stain resistance, fragrance (e.g., perfumes), insect repellency, and UV protection.

A cutter 467 or other suitable mechanism may be provided in or adjacent the treating chemistry dispenser 462 and may be configured to physically alter the unit dose container 463. By way of non-limiting example, the cutter 467 may include a shearer or a piercer both of which may be used to alter the unit dose container 463. A blocking plate or other mechanism (not shown) may be used to prevent a user from accessing the cutter 467. The cutter may be operably coupled to the controller 414. Further, a sensor 410 may be positioned in any suitable location for detecting a physical alteration of the unit dose container 463 and may be operably coupled to the controller to provide an output indicative of a presence in the treating chemistry dispenser 462 of a unit dose container 463, which has been physically altered.

A mixing chamber 471 may be provided to couple the treating chemistry dispenser 62 to the treating chamber 434 through a supply conduit 465. Pumps such as a metering pump 464 and delivery pump 466 may be provided to the dispensing system 457 to selectively supply a treating chemistry and/or liquid to the treating chamber 434 according to a cycle of operation. The water supply 468 may be fluidly coupled to the mixing chamber 471 to provide water from the water source to the mixing chamber 471. The water supply 468 may include an inlet valve 470 and a water supply conduit 472. It is noted that, instead of water, a different treating chemistry may be provided from the exterior of the clothes dryer 400 to the mixing chamber 471.

The dryer 400 may also be provided with a steam generating system 480 which may be separate from the dispensing system 457 or integrated with portions of the dispensing system 457 for dispensing steam and/or liquid to the treating chamber 434 according to a cycle of operation. The steam generating system 480 may include a steam generator 482 fluidly coupled with the water supply 468 through a steam inlet conduit 484. A fluid control valve 485 may be used to control the flow of water from the water supply conduit 472 between the steam generating system 480 and the dispensing system 457. The steam generator 482 may further be fluidly coupled with the one or more supply conduits 465 through a steam supply conduit 486 to deliver steam to the treating chamber 434 through the nozzles 469. Alternatively, the steam generator 482 may be coupled with the treating chamber 434 through one or more conduits and nozzles independently of the dispensing system 457. The steam generator 482 may be any type of device that converts the supplied liquid to steam. It will be understood that the details of the steam generating system 480 are not germane to the embodiment of the invention and that any suitable steam generating system may be used with the dryer 400. It is also within the scope of the invention for the dryer 400 to not include a steam generating system.

During operation, the dryer 400 may be configured to physically alter the unit dose container 463 in conjunction with a first execution of an at least one cycle of operation such as through cutting the unit dose container with the cutter 467. The dryer 400 may then sense through use of the sensor 410 the physical alteration of the unit dose container 463 in conjunction with a second execution of an at least one cycle of operation. Based on the output from the sensor 410 the controller 414 may determine a presence of the physically altered unit dose container 463 and provide an indication of the presence of the physically altered unit dose container 463 to a user. It will be understood that any of the previously described alteration methods may be used to alter the unit dose container 463 and that any of the previously described sensing methods may be used to sense the alteration.

Figure 12:
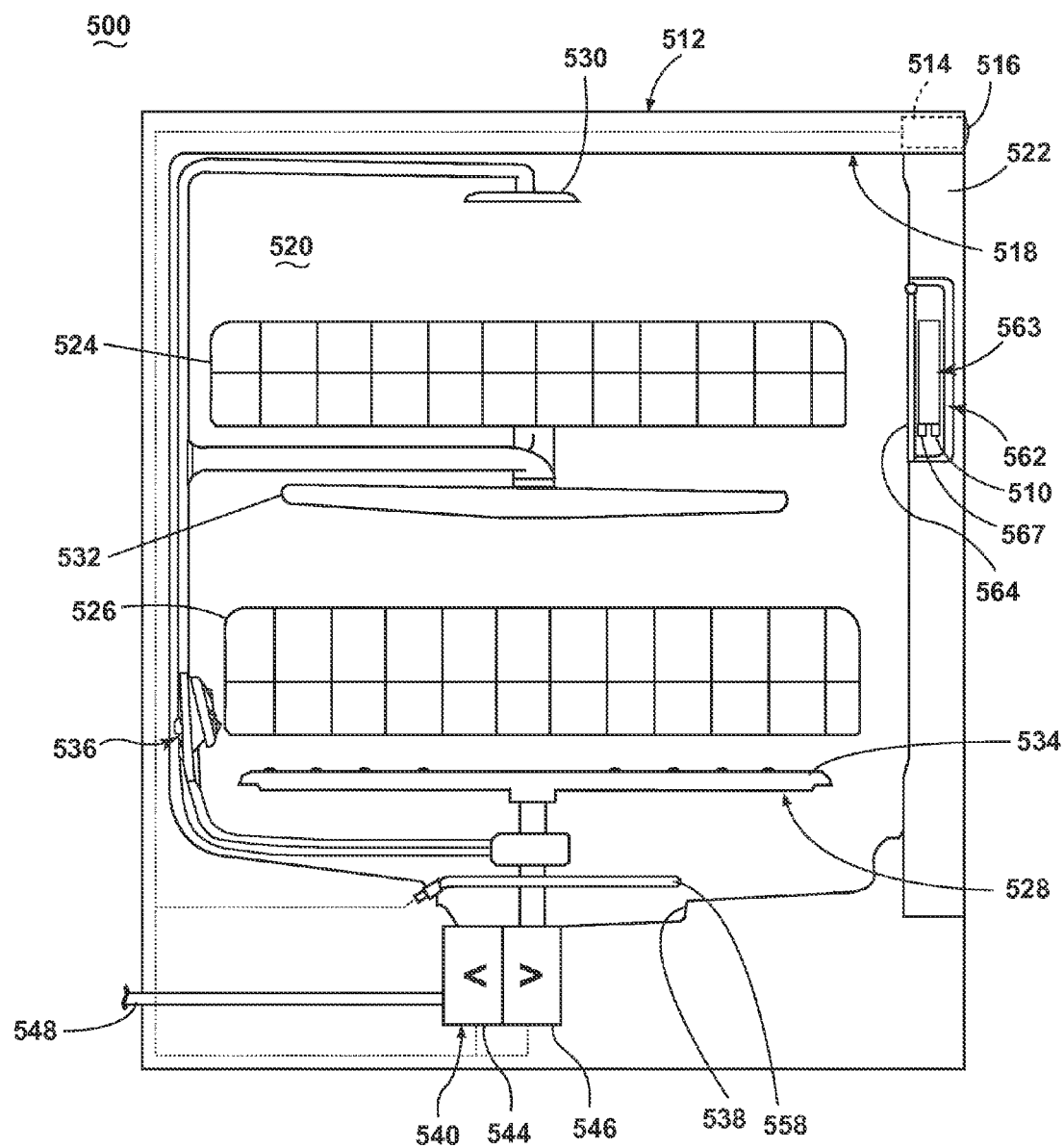
FIG. 12 is a schematic view of a household appliance in the form of a dishwasher according to a sixth embodiment of the invention.

FIG. 12 illustrates yet another household appliance in the form of a dishwasher 500 that may be controlled according to embodiments of the invention. The dishwasher 500 includes a cabinet 512 that may be controlled according to one embodiment of the invention, which shares many features of a conventional automatic dishwasher, which will not be described in detail herein except as necessary for a complete understanding of the invention. While the present invention is described in terms of a conventional dishwashing unit, it could also be implemented in other types of dishwashing units, such as in-sink dishwashers, multi tub dishwashers, or drawer-type dishwashers.

A controller 514 may be located within the cabinet 512 and may be operably coupled to various components of the dishwasher 500 to implement one or more cycles of operation. A control panel or user interface 516 may be provided on the dishwasher 500 and coupled to the controller 514. The user interface 516 may include operational controls such as dials, lights, switches, and displays enabling a user to input commands, such as a cycle of operation, to the controller 514 and receive information such as an indication of the presence of a physically altered unit dose container.

A tub 518 is located within the cabinet 512 and at least partially defines a treating chamber in the form of a dish treating chamber 520, with an access opening in the form of an open face. A cover, illustrated as a door 522, may be hingedly mounted to the cabinet 512 and may move between an opened position, wherein the user may access the treating chamber 520, and a closed position wherein the door 522 covers or closes the open face of the treating chamber 520. Utensil holders in the form of upper and lower racks 524, 526 are located within the treating chamber 250 and receive dishes for being treated. As used in this description, the term "dishe(s)" is intended to be generic to any item, single or plural, that may be treated in the dishwasher 500, including, without limitation: utensils, plates, pots, bowls, pans, glassware, and silverware.

A spraying system 528 may be provided for spraying liquid into the treating chamber 520 and is illustrated as having multiple sprayers in the form of an upper sprayer 530, a mid-level sprayer 532, a lower rotatable spray arm 534, and a spray manifold 536. Suitable spray manifolds are set forth in detail in U.S. Pat. No. 7,445,013, issued Nov. 4, 2008, and titled "Multiple Wash Zone Dishwasher," and U.S. Pat. No. 7,523,758, issued Apr. 28, 2009, and titled "Dishwasher Having Rotating Zone Wash Sprayer," both of which are incorporated herein by reference in their entirety.

A liquid recirculation system may be provided for recirculating liquid from the treating chamber 520 to the spraying system 528. The recirculation system may include a sump 538 and a pump assembly 540. The pump assembly 540 may include both a drain pump 544 and a recirculation pump 546. The drain pump 544 may draw liquid from the sump 538 and pump the liquid out of the dishwasher 500 to a household drain line 548. The recirculation pump 546 may draw liquid from the sump 538 and pump the liquid to the spraying system 528 to supply liquid into the treating chamber 520.

A heating system having a heater 558 may be located within or near the sump 538 for heating liquid contained in the sump 538. A filtering system (not shown) may be fluidly coupled with the recirculation flow path for filtering the recirculated liquid.

The treating chemistry dispenser 562 may be provided to receive a unit dose container 563 and provide a supply of treating chemistry for dispensing into the dish treating chamber 520. As illustrated the treating chemistry dispenser 562 may be mounted on an inside surface of the door 522 such that the treating chemistry dispenser 562 is disposed in the treating chamber 520 when the door 522 is in the closed position. The treating chemistry dispenser 562 may have one or more compartments closed by a door 564 on the inner surface of the dishwasher door 522 or may include a drawer as previously described with respect to some of the embodiments above. The unit dose container 63 may include any suitable unit dose container 63 including a cartridge. Non-limiting examples of treating chemistries that may be contained in the unit dose container for use in the dish treating chamber may include one or more of the following: water, enzymes, detergents, surfactants, and other cleaning or conditioning chemistry and combinations thereof.

A cutter 567 may be provided in or adjacent the treating chemistry dispenser 562 and may be configured to cut at least a portion of the unit dose container 563. The cutter 567 may be any suitable mechanism capable of physically altering the unit dose container 563. By way of non-limiting example, the cutter 567 may include a shearer or a piercer both of which may be used to alter the unit dose container 563. A blocking plate or other mechanism (not shown) may be used to prevent a user from accessing the cutter 567. The cutter may be operably coupled to the controller 514. Further, a sensor 510 may be positioned in any suitable location for detecting a physical alteration of the unit dose container 63 and may be operably coupled to the controller to provide an output indicative of a presence in the treating chemistry dispenser 62 of a unit dose container 63, which has been physically altered. It will be understood that any of the previously described alteration methods may be used to alter the unit dose container 563 and that any of the previously described sensing methods may be used to sense the alteration.

During operation, the dishwasher 500 may be configured to physically alter the unit dose container 563 in conjunction with a first execution of an at least one cycle of operation such as through cutting the unit dose container. The dishwasher 500 may then sense the physical alteration of the unit dose container 563 in conjunction with a second execution of an at least one cycle of operation, such as through use of the sensor 510. The controller 514 may determine a presence of a physically altered unit dose container and provide an indication of the presence of the physically altered unit dose container 563 based on such determination.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

The above described embodiments provide a variety of benefits including verifying that a unit dose container is new and full and executing a cycle of operation when the unit dose container has been verified. This allows the appliance to assure proper operation of the system by not executing the cycle of operation without a new full unit dose present. The above embodiments may alert a user and/or stop execution of a cycle should a user attempt to use a refilled unit dose container and reuse the unit dose container multiple times in the appliance and/or system. This may prevent the use of other treating chemistries which could damage the appliance or the items being cleaned. Further, this may prevent the use of treating chemistries that are not from a designated manufacturer. Further, the above embodiments may also make it more difficult for makers of counterfeit fluid containers. The above described embodiments aid in ensuring better performance of the appliance such as the treating quality of items, which may otherwise deteriorate if a not new not full unit dose container is loaded into the appliance.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a household appliance having a laundry or dish treating chamber in which is received an article for treatment, a treating chemistry dispenser configured to receive a single unit dose container of treating chemistry, and a controller for executing at least one cycle of operation, the method comprising:
    physically altering the container of the single unit dose container in conjunction with a first execution of at least one cycle of operation and where the container is altered in a location that does not release stored treating chemistry;
    sensing, by a sensor, a physical alteration of the container of the single unit dose container, physically altered during the first execution, in conjunction with a second execution of another at least one cycle of operation or sensing a physical alteration of a container of another single unit dose container in conjunction with a second execution of another at least one cycle of operation;
    determining a presence of a physically altered single unit dose container based on the sensing; and
    providing an indication of the determined presence of the physically altered single unit dose container.

2. The method of claim 1 wherein the physically altering the single unit dose container comprises cutting a portion of the single unit dose container.

3. The method of claim 2 wherein cutting the portion of the single unit dose container comprises forming a less stiff portion of the single unit dose container.

4. The method of claim 3 wherein the sensing the physical alteration comprises sensing the less stiff portion of the single unit dose container.

5. The method of claim 4 wherein sensing the less stiff portion comprises contacting the less stiff portion with a pressure switch.

6. The method of claim 5 wherein the determining the presence of the physically altered single unit dose container comprises determining a state of the pressure switch.

7. The method of claim 2 wherein cutting a portion of the single unit dose container comprises cutting a top of the container.

8. The method of claim 7 wherein the sensing the physical alteration comprises sensing the cutting force.

9. The method of claim 8 wherein the determining the presence of a physically altered unit dose container comprises comparing the sensed cutting force to a predetermined cutting force.

10. The method of claim 2 wherein cutting a portion of the unit dose container comprises severing an electrical conductor provided on the single unit dose container.

11. The method of claim 10 wherein sensing the physical alteration comprises applying an electric potential between the two ends of the electrical conductor.

12. The method of claim 11 wherein the sensing the physical alteration comprises sensing the electrical current through the electrical conductor produced by the electric potential applied between the two ends of the electrical conductor to sense the conductance between the two ends of the electrical conductor.

13. The method of claim 12 wherein the determining the presence of a physically altered unit dose container comprises comparing the sensed conductance to a reference conductance.

14. The method of claim 1 wherein the physically altering comprises reducing a structural integrity of at least a portion of the single unit dose container.

15. The method of claim 1 wherein the physically altering comprises altering a conductance of at least a portion of the single unit dose container.

16. The method of claim 1 wherein the sensing the physical alteration comprises sensing a rigidity of at least a portion of the single unit dose container.

17. The method of claim 1 wherein the sensing the physical alteration comprises sensing a conductance of at least a portion of the single unit dose container.

18. The method of claim 1 wherein the providing the indication comprises failing to further implement the second execution.

19. The method of claim 1 wherein the providing the indication comprises ceasing the second execution after implementing the second execution.

20. The method of claim 1 wherein the providing the indication comprises providing an indication via a user interface of the appliance.

21. The method of claim 20 wherein the providing an indication via the user interface comprises providing at least one of a visual indication or an aural indication via the user interface.

22. The method of claim 1 wherein the physically altering the single unit dose container comprises piercing a portion of the single unit dose container.

23. The method of claim 22 wherein the sensing the physical alteration comprises optically sensing the physical alteration of the single unit dose container caused by the piercing.

* * * * *